United States Patent [19]

Arikawa

[11] Patent Number: 5,026,127
[45] Date of Patent: Jun. 25, 1991

[54] FLUID PRESSURE BRAKE CONTROL APPARATUS FOR A VEHICLE

[75] Inventor: Tetsuro Arikawa, Kanagawa, Japan

[73] Assignee: Nippon A.B.S., Ltd., Tokyo, Japan

[21] Appl. No.: 400,570

[22] Filed: Aug. 30, 1989

[30] Foreign Application Priority Data

Sep. 5, 1988 [JP] Japan .................................. 63-221530
Jan. 30, 1989 [JP] Japan .................................. 1-9713[U]

[51] Int. Cl.⁵ .............................................. B60T 8/40
[52] U.S. Cl. .................................... 303/116; 303/110; 303/119
[58] Field of Search ............... 303/116, 119, 113, 114, 303/115, 110, 10–12; 188/181; 180/197

[56] References Cited

U.S. PATENT DOCUMENTS

| 4,421,361 | 12/1983 | Arikawa et al. |         |
|-----------|---------|----------------|---------|
| 4,453,782 | 6/1984  | Arikawa et al. |         |
| 4,509,802 | 4/1985  | Solleder et al.|         |
| 4,569,560 | 2/1986  | Kubo           | 303/116 |
| 4,585,281 | 4/1986  | Schnürer       |         |
| 4,627,671 | 12/1986 | Matsui et al.  | 303/116 |
| 4,637,664 | 1/1987  | Arikawa        | 303/113 X |
| 4,726,630 | 2/1988  | Krohn et al.   | 303/116 X |
| 4,818,039 | 4/1989  | Bertling et al.|         |
| 4,861,118 | 8/1989  | Burckhardt et al.| 303/116 X |

FOREIGN PATENT DOCUMENTS

62-134361 6/1987 Japan .
1157069 10/1989 Japan .

Primary Examiner—Douglas C. Butler
Attorney, Agent, or Firm—Jones, Day, Reavis & Pogue

[57] ABSTRACT

A control unit for judges braking slip and/or driving slip of front and rear wheels. Fluid pressure control valve devices receive instructions from the control unit for controlling brake fluid pressure of the front and rear wheel brake apparatuses. A first fluid pressure pump pressurizes and supplies brake fluid from hydraulic reservoirs into main conduits connecting a tandem master cylinder with the fluid pressure control valve devices. A first valve device is arranged between the tandem master cylinder and the first fluid pressure pump in the main conduit means connected through the fluid pressure control valve devices to front and/or rear brake apparatuses. The first valve device is normally in free communication and changed over into a position to prohibit brake fluid to flow from the discharging side of the first fluid pressure pump towards the master cylinder side under a first predetermined condition. A second valve device is arranged between the master cylinder and first fluid pressure pump in main conduits connected through the control valve devices at least to the front brake apparatus. The second valve device is normally in free communication and changeable into a position to prevent brake fluid having the discharging side of the first fluid pressure pump towards the master cylinder side under a second predetermined condition. The hydraulic reservoirs consist of a first hydraulic reservoir for previously reserving brake fluid and a second hydraulic reservoir. A second fluid pressure pump is arranged in a conduit connecting the first hydraulic reservoir with the second hydraulic reservoir, the discharging side of which is directed to the suction side of the first fluid pressure pump.

17 Claims, 9 Drawing Sheets

FLUID PRESSURE BRAKE CONTROL APPARATUS FOR A VEHICLE

BACKGROUND OF THE INVENTION

1. Field of the Invention

This invention relates to a fluid pressure brake control apparatus for a vehicle which controls braking slip and driving slip of wheels.

2. Description of the Prior Art

For example, Japanese Patent Opening Gazette No. 134361/1987 discloses a braking slip control apparatus or lock preventing apparatus. In this apparatus, a fluid pressure control valve is arranged between the master cylinder and the wheel brake apparatus. When the brake to the wheel brake apparatus is decreased, the brake fluid is discharged into the hydraulic reservoir through the fluid pressure control valve from the wheel brake apparatus. And when the brake to the wheel brake apparatus is again increased, the brake fluid discharged into the hydraulic reservoir is pressurized by a fluid pressure pump and supplied into the conduit between the fluid pressure control valve and the wheel brake apparatus.

On the other hand, necessity of a driving slip control apparatus together with a braking slip control apparatus has arisen in order to suppress the excessive slip of the drive wheel on the rapid start and the rapid acceleration with the rapid rise of the engine power and to facilitate the driving operation and improve the steering ability, the acceleration and rapid starting ability of the vehicle.

In order to solve the above described problem, this Applicant improved the apparatus described in the above described Japanese Patent Opening Gazette No 134361/1987. In this improved apparatus (Japanese Utility Model Registration Application No. 54240/1988), a reservoir for a tandem master cylinder is used commonly as the hydraulic reservoir connected to the fluid pressure control valve. Thus, when the brake to the wheel brake apparatus is decreased, the brake fluid is discharged into the reservoir for the tandem master cylinder, and the brake is applied in the driving slip control by the fluid pressure pump. The discharging fluid of the fluid pressure pump is returned into the reservoir for the tandem master cylinder in the brake decreasing operation. The return conduit is arranged to by-pass the input and output sides of the fluid pressure control valve. In order to prevent the brake application to a wheel brake apparatus from being impossible, a cut-off valve is arranged in the return conduit.

However, if the brake fluid discharged directly into the reservoir for the master cylinder is not returned through the conduit connecting the fluid pressure control valve with the master cylinder into the fluid pressure generating chamber side of the master cylinder, after the driving slip control ends, the piston stroke of the master cylinder would be unnecessarily large or the stroke of the brake pedal would become unnecessarily long.

After the brake fluid pressure to the wheel brake apparatus does not need to be controlled, the amount of the brake fluid discharged should be returned to the fluid pressure generating chamber of the master cylinder by the fluid pressure pump. Therefore, the control operation is complicated, and to infer the amount of the discharged brake fluid is very difficult. For example, a fluid level switch may to be arranged in the hydraulic reservoir to measure the discharged amount of brake fluid. However, this method is inaccurate and the construction is complicated. Further, the apparatus has a defect that the kick-back phenomena to the brake pedal occur.

SUMMARY OF THE INVENTION

Accordingly, it is an object of this invention to provide a simple construction for an easily controlled fluid pressure brake control apparatus for a vehicle which ca control the braking slip and the driving slip of the wheels and improve the brake pedal feeling and the braking slip control operation.

It is another object of this invention to provide a fluid pressure brake control apparatus for a vehicle which can be small-sized and light, effecting the drive and/or slip control operation.

In accordance with an aspect of this invention, a fluid pressure brake control apparatus for vehicle comprises: (A) a tandem master cylinder; (B) front wheel brake apparatus for front wheel or wheels; (C) rear wheel brake apparatus for rear wheel or wheels; (D) a control unit for judging braking slip and/or driving slip of said front and rear wheels; (E) fluid pressure control valve means receiving instructions from said control unit for controlling brake fluid pressure to said front and rear wheel brake apparatus; (F) hydraulic reservoir means for reserving brake fluid discharged through said fluid pressure control valve means from said front and/or rear wheel brake apparatus; (G) first fluid pressure pump means for pressurizing and supplying the brake fluid from said hydraulic reservoir means into main conduit means connecting said tandem master cylinder with said fluid pressure control valve means; (H) a first valve device arranged between said tandem master cylinder and said first fluid pressure pump means in said main conduit means connected through said fluid pressure control valve means to said front and/or rear brake apparatus for said front wheels and/or rear wheels as drive wheels, said first valve device being normally in free communication and being changed over into a position to prohibit brake fluid to flow from the discharging side of said first fluid pressure pump means towards said master cylinder side under a first predetermined condition; (I) a second valve device arranged between said tandem master cylinder and said first fluid pressure pump means in said main conduit means and being connected through said fluid pressure control valve means at least to said front brake apparatus for said front wheels, said second valve device being normally in free communication and being changed over into a position, to prohibit brake fluid from flowing the discharging side of said first fluid pressure pump means towards said master cylinder side under a second predetermined condition; (J) said hydraulic reservoir means consisting of a first hydraulic reservoir reserving previous brake fluid and a second hydraulic reservoir being able to reserve brake fluid; and (K) a second fluid pressure pump means arranged in a conduit connecting said first hydraulic reservoir with said second hydraulic reservoir, the discharging side of which is directed to the suction side of said first fluid pressure pump means.

In accordance with another aspect of this invention, a fluid pressure brake control apparatus for a vehicle comprises; (A) a first brake conduit system which connects a tandem master cylinder with a front wheel brake apparatus for front wheel or wheels; (B) a second brake conduit system which connects said tandem master cylinder with a rear wheel brake apparatus for rear wheel or wheels; (C) a control unit for judging braking slip and/or driving slip of said front and/or rear wheels; (D) fluid pressure control valve means being arranged in said first and second brake conduit systems and receiving instructions from said control unit, for controlling brake fluid pressures to said wheel brake apparatus, respectively; (E) hydraulic reservoir means for reserving the brake fluid discharged through said fluid pressure control valve means from said wheel brake apparatus, respectively; (F) first fluid pressure pump means for pressurizing the brake fluid in said hydraulic reservoir and supplying it to main conduit means connecting said tandem master cylinder with said fluid pressure control valve means; (G) first valve apparatus being arranged between the discharging side of said first fluid pressure pump means and said tandem master cylinder in said first and second brake conduit systems, said first valve apparatus cutting off at least the fluid communication directing from the discharging side of said first fluid pressure pump means towards said tandem master cylinder side with the discharging pressure of said first fluid pressure pump means; (H) second valve apparatus being arranged in by-pass conduit means connecting said wheel brake apparatus with said tandem master cylinder and by-passing said fluid pressure control valve means and said first valve apparatus, in said first and/or second brake conduit systems, said second valve apparatus being normally in free communicating state and changing over to a cut-off state on driving slip control; (I) said hydraulic reservoir means consisting of a first hydraulic reservoir reserving previously brake fluid and a second hydraulic reservoir being able to reserve brake fluid; (J) second fluid pressure pump means arranged in a conduit connecting said first hydraulic reservoir with said second hydraulic reservoir, the discharging side of which is directed to the suction side of said first fluid pressure pump means; and (K) a hydraulic accumulator arranged only in the discharging side of said first fluid pressure pump means belonging to one of said first and second brake conduit systems.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Next, a fluid pressure brake control apparatus for a vehicle according to embodiments of this invention will be described with reference to the drawings.

Figure 1:
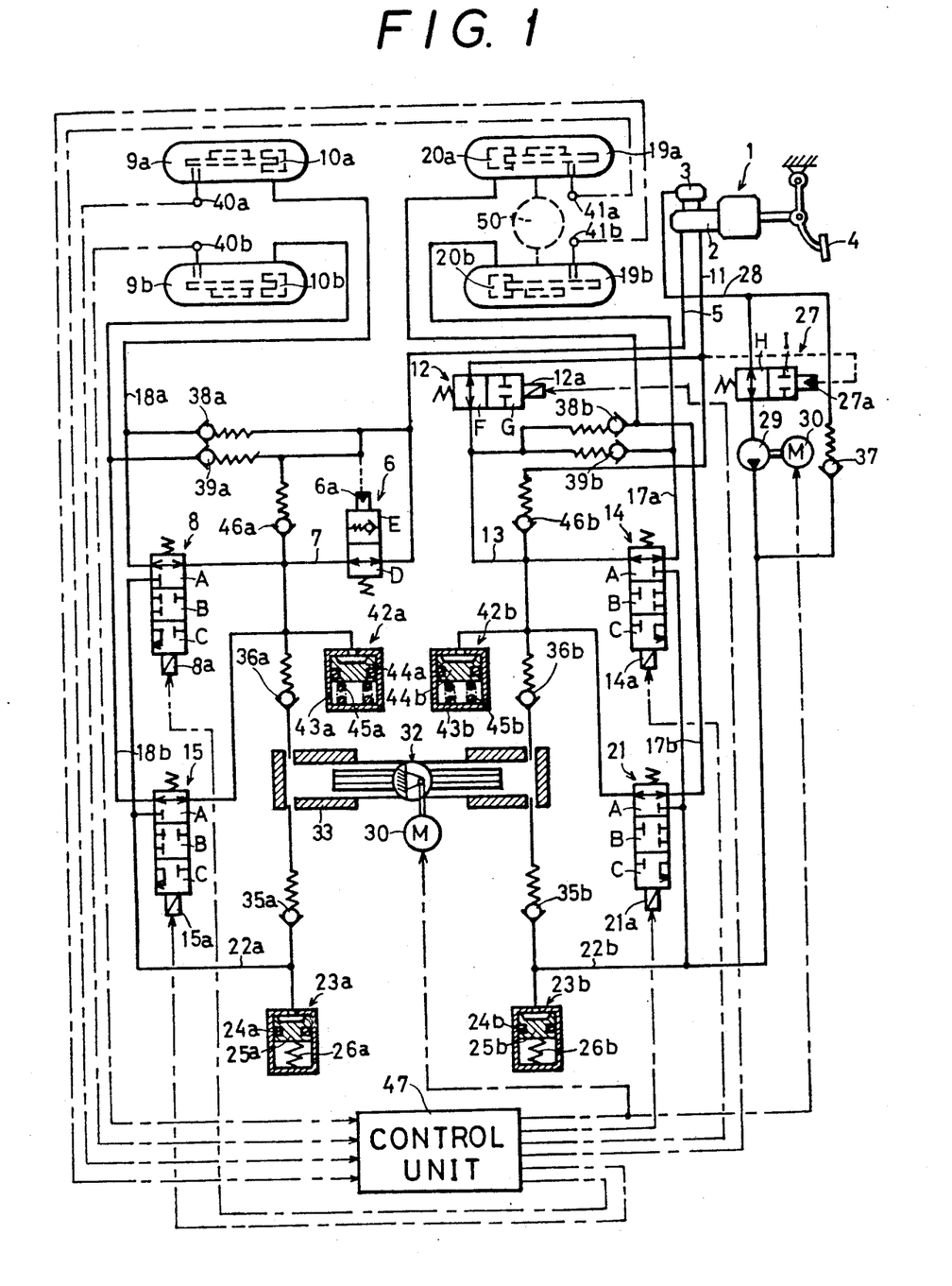
FIG. 1 to FIG. 9 are schematic views of a fluid pressure brake control apparatus for a vehicle according to first to ninth embodiments of this invention.

FIG. 1 shows a first embodiment of this invention. In FIG. 1, two fluid pressure generating chambers are formed in a cylinder body 2 of a tandem master cylinder 1. A hydraulic reservoir 3 for reserving brake fluid is formed integrally with the cylinder body 2. The reservoir 3 functions as a first hydraulic reservoir.

A brake pedal 4 is connected to the cylinder body 2. A piston fitted to the cylinder body 2 is driven by the brake pedal 4. With the treading of the brake pedal 4, fluid pressures generate in the two fluid pressure generating chambers of the cylinder body 2. Conduits 5, 11 are connected to the two fluid pressure generating chambers, respectively.

One conduit 5 is connected through a check valve device 6 as a second valve device, a conduit 7, a three-port three-position electro-magnetic change-over valve 8 as a fluid pressure control valve and a conduit 18a to a wheel cylinder 10a of a right front wheel 9a.

The conduit 7 is further connected through a change-over valve 15 similar to the above-described change-over valve 8 and a conduit 18b to a wheel cylinder 10b of a left front wheel 9b.

The other fluid pressure generating chamber of the cylinder body 2 is connected through the conduit 11, a cut-off valve device 12 as a first valve device, a conduit 13, a three-port three-position change-over valve 14 as a fluid pressure control valve, a conduit 17a and a not shown proportional pressure reducing valve to the wheel cylinder 20b of a left rear wheel 19b.

The conduit 13 is connected through a change-over valve 21, a conduit 17b, a not shown proportional pressure reducing valve to a wheel cylider 20a of a right rear wheel 19a. Thus, a front-rear separation conduit system is employed in this embodiment.

Discharge ports of the change-over valves 8 and 15 for the one conduit system are connected through a common discharge conduit 22a to one reservoir 23a as a second hydraulic reservoir.

Discharge ports of the change-over valves 14, 21 of the other conduit system are connected through a common discharge conduit 22b to another reservoir 23b as a second hydraulic reservoir. The hydraulic reservoirs 23a, 23b have well known constructions. Relatively weak springs 26a, 26b are arranged in casings 24a, 24b and they urge pistons 25a, 25b upwards.

A suction side of a first fluid pressure pump 32 is connected to the discharge conduits 22a and 22b. The fluid pressure pump 32 has a well known construction. It has a casing 33, a piston slidably fitted into the casing 33, and an eccentric cam driven by an electric motor 30. The fluid pressure pump 32 further includes check valves 35a, 35b, 36a and 36b. Discharge side of the fluid pressure pump 32 is connected through the check valves 36a, 36b to the conduits 7 and 13 and further to accumulators 42a, 42b which have well known constructions. Pistons 44a, 44b provided with seal rings are slidably fitted to casings 43a, 43b and the pistons 44a and 44b are urged upwards by relatively strong springs 45a, 45b. When a pressurized fluid is discharged from the fluid pressure pump 32, the pistons 44a, 44b are pressed downwards against the springs 44a, 45b in the accumulators 42a, 42b. Thus, the accumulators 42a, 42b function to store the pressurized fluid. Check valves 46a, 46b as relief valves are connected in parallel with the check valve device 6 and the cut-off valve device 12, respectively.

The reservoir 3 of the tandem master cylinder 1 as a first hydraulic reservoir is connected to a conduit 28. It is further connected through a cut-off valve device 27 as a third valve device to a suction side of an auxiliary fluid pressure pump 29 as a second fluid pressure pump. The discharge side of the auxiliary fluid pressure pump 29 is connected to the hydraulic reservoir 23b as a second hydraulic reservoir. A check valve 37 as a relief valve is connected in parallel with the cut-off valve device 27 and the auxiliary fluid pressure pump 29.

The cut-off valve device 27 takes normally a position H in which both sides communicate with each other. A pressure detecting portion 27a of the cut-off valve device 27, to which the conduit 11 is connected, detects a higher pressure than the predetermined value. The cut-off valve device 27 is changed over to a position I in which both sides are cut off from each other with the detection.

Check valves 38a, 38b, 39a, 39b are connected between the input ports and output ports of the change-over valves 8, 14, 15 and 21, respectively. They permit the fluid to flow from the wheel cylinder side to the master cylinder side.

The auxiliary fluid pressure pump 29 is driven by the electric motor 30 which further drives the first fluid pressure pump 32. Accordingly, the fluid pressure pumps 29, 32 are controlled in common. Although the second fluid pressure pump 29 is schematically shown, it has the similar construction to the first fluid pressure pump 32.

Thus, the fluid pressure pump 29 has a well known construction. It includes mainly a casing, a piston slidably fitted to the casing, a fluid chamber formed at one side of the piston and check valves connected to the suction side and the discharge side of the fluid chamber, respectively. The piston is driven through a cam mechanism by the electric motor 30. Brake fluid is sucked to the fluid chamber through the one check valve, and the brake fluid is discharged from the fluid chamber through the other check valve. Accordingly, the one check valve permits the fluid to flow towards the fluid chamber, and the other check valve permits the fluid to flow towards the discharge side from the fluid chamber. The check valves are not shown in FIG. 1. The auxiliary fluid pressure pump 29 has a discharging capacity enough to open the check valve 35b connected to the suction side of the fluid pressure pump 32.

Next, the check valve device 6 will be described in detail. It takes normally a position D, in which the master cylinder side and wheel cylinder side communicate with each other. However, when the fluid pressure of the conduit 5 becomes higher than a predetermined pressure, the check valve device 6 is changed over to a position E with detection of the pressure detecting portion 6a. It functions as a check valve in the position E. It permits fluid to flow from the conduit 5 side towards the conduit 7 side.

A control unit 47 receives output signals of wheel speed sensors 40a, 40b, 41a, 41b associated with the wheels 9a, 9b, 19a and 19b, respectively. The rear wheels 19a, 19b are driven wheels. The control unit 47 judges whether the drive wheels 19a, 19b are subjected to a drive slip more than a predetermined value or not, and skid conditions of the wheels 9a, 9b, 19a, 19b. On the basis of the skid conditions, the control unit 47 further judges whether the brake should be increased or not, decreased or not, and should be maintained constant, or not. Control signals from the control unit 47 are supplied to the solenoid portions 8a, 14a, 15a and 21a of the change-over valves 8, 14, 15, 21 and the solenoid portion 12a of the cut-off valve device 12, respectively. The cut-off valve device 12 takes normally position F in which both sides communicate with each other. When the solenoid portion 12a of the cut-off valve device 12 is energized with the control signal from the control unit 47, it is changed over to a position G in which both sides are cut off from each other. The change-over valves 8, 14, 15, 21 have the same construction as each other. Accordingly, the change-over valve 8 is representatively described. When the current level supplied to the solenoid portion 8a is "0", it takes a position A and the side of the conduit 7 communicates with the wheel cylinder side. When the current level is "½", it takes a position B and the side of the conduit 7 is cut off from the wheel cylinder side and further the wheel cylinder side is cut off from the discharge conduit 22a side. When the current level is "1", the change-over valve 8 takes the position C in which the master cylinder side is cut off from the wheel cylinder side and the wheel cylinder side communicates with the discharge conduit 22a side. Accordingly, the pressurized fluid from the wheel cylinder 10a is discharged into the hydraulic reservoir 23a. A differential gear 50 is arranged between the rear wheels 19a and 19b.

Next, there will be described the operation of the above described fluid pressure control apparatus.

First, driving slip control operation will be described. For example, when the vehicle is rapidly started and the drive torque of the engine becomes too much, the control unit 47 detects through the wheel speed sensors 40a, 40b, 41a and 41b that the driven wheels 19a and 19b slip more than a predetermined value. It is assumed that the rear wheels 19a and 19b drive-slip in the same manner, for facilitation of the description. The fluid pressure pumps 29 and 32 start to drive. The solenoid portion 12a of the valve apparatus 12 is energized and the solenoid portions 8a and 15a of the change-over valves 8 and 15 are energized by the current level ½. Thus, the valve apparatus 12 is changed over to the position G, and the change-over valves 8 and 15 are changed over to the position B. The valve device 12 functions as a cut-off valve. The change-over valves 8 and 15 take the cut-off position. In such a condition, the brake fluid is sucked by the auxiliary fluid pressure pump 29 from the hydraulic reservoir 3 of the tandem master cylinder 1, when the valve device 27 as the third valve device remains communicated. The brake fluid from the fluid pressure pump 29 is discharged into the hydraulic reservoir 23b. It is immediately sucked up by the fluid pressure pump 32 and it is supplied to the wheel cylinders 20a and 20b of the driven wheels 19a and 19b through the conduit 13 and change-over valves 14, 21 which take the position A. Thus, the driven wheels 19a and 19b are braked and the driving slips of them decrease.

According to the control unit 47 of this embodiment, the change-over valves 14 and 21 take the position B, C or A and so the brake is maintained at constant, relieved or reapplied for controlling the driving slips of the driven wheels 19a and 19b. Thus, the brake holding, brake relieving and brake reapplying are so repeated as to control the driving slip to the optimum.

When the control unit 47 detects that the drive slip becomes little or reaches the optimum, the power supply to the motor 30 for driving the fluid pressure pumps 29 and 32 is cut out. Further, the solenoid portion 12a of the valve device 12 as the first valve device is deenergized and it takes the original position F. Further, the solenoid portions 8a, 14a, 15a, 21a of the change-over valves 8, 14, 15, 21 are deenergized. Thus, the change-over valves 8, 14, 15 and 21 take the original positions A.

The driving slip control is so effected as above described. When the discharging pressure of the fluid pressure pump 32 becomes extraordinarily high, the check valve 46b opens as a relief valve. Accordingly, the brake fluid can be returned to the master cylinder 1 side. The fluid pressure pump 32 is protected from the damage due to the excessively high fluid pressure That holds true of the second fluid pressure pump 29. The check valve 37 as a relief valve opens to protect the fluid pressure pump 29 from the damage due to the excessively high pressure.

Next, the anti-skid control operation will be described. When the brake pedal 4 is rapidly trodden during the running of the vehicle, the wheels 9a, 9b, 19a, 19b show a tendency to lock. The control unit 47 judges the brake should be maintained at constant. The control signals of current level "½" are supplied to the solenoid portions 8a, 14a, 15a, 21a of the change-over valves 8, 14, 15, 21. They are changed-over to the positions B. Thus, the brakes to the wheels 9a, 9b, 19a, 19b are maintained at constant. For facilitation of the understanding of the description, it is assumed that all of the wheels change under the same skid condition.

Next, when the control unit 47 judges the brake force is still large and so the brake should be relieved, the control signals of current level "1" are supplied to the solenoid portions 8a, 14a, 15a, 21a of the change-over valves 8, 14, 15, 21. Thus, they are changed over to the positions C. Accordingly, pressurized fluid from the wheel cylinders 10a, 10b, 20a and 20b of the wheels 9a, 9b, 19a and 19b is discharged into the reservoirs 23a, 23b through the discharge ports of the change-over valves 8, 14, 15, 21 and the discharge conduits 22a, 22b. Thus, the brakes to the wheels are relieved.

Since the electric motor 30 drives the fluid pressure pump 32, also the auxiliary fluid pressure pump 29 is driven during the anti-skid control operation. If the valve device 27 is not provided, the brake fluid is sucked from the reservoir 3 of the tandem master cylinder 1 and it is supplied to the second reservoir 23b. The more amount of the brake fluid than the discharged amount of the brake fluid from the wheel cylinder would be reserved in the second reservoir 23b. At that time, the brake fluid pressure of the wheel is hard to decrease. Particularly, when the vehicle runs from a road of high frictional coefficient to another road of low frictional coefficient, namely the "μ-jump" phenomenon occurs, more amount of the brake fluid should be discharged into the reservoir 23b from the wheel cylinder. At that time, if the brake fluid is discharged from the reservoir 3 of the tandem master cylinder 1, the pressurized fluid would be hard to discharge from the wheel cylinder and so the brake would be hard to be relieved. There is a fear that the wheel locks.

However, since the valve device or the cut-off valve 27 is provided in this embodiment, such a fear can be avoided. The higher fluid pressure than the predetermined value generates in the conduit 11 with the treading of the brake pedal 4. It is detected by the fluid pressure detecting portion 27a and so the valve device 27 is changed over to the cut-off position I. Both sides are cut off from each other. Accordingly, the auxiliary pressure pump 29 drives idly. No fluid pressure occurs at the discharging side of the auxiliary fluid pressure pump 29. In other words, the brake fluid is not sucked from the reservoir 3 of the tandem master cylinder 1. Thus, there is not the above-described problem. During the anti-skid control operation, the discharging fluid of the fluid pressure pump 32 is returned through the conduit 11 into the master cylinder side since the valve device 12 takes the position F. On the other hand, since the check valve device 6 takes the position E, the discharging fluid of the fluid pressure pump 32 is not returned to the master cylinder 1 through the conduit 5. The control unit 47 judges whether the brake should be maintained at constant or not, the brake should be relieved or not, or the brake should be reapplied or not. Accordingly, the solenoid portions of the change-over valves 8, 14, 15, 21 are energized by the control signals of the current level of "½", "1" or "0". The change-over valves take the positions B, C or A. As above described, when the change-over valves are changed over to the positions B, the master cylinder side is cut-off from the wheel cylinder side, and so the brakes to the wheels are maintained at constant. When they are changed over to the positions C, the pressurized fluid is discharged into the reservoirs 23a and 23b through the discharge conduits 22a, 22b from the wheel cylinders.

The brake fluid from the reservoirs 23a and 23b is immediately sucked by the fluid pressure pump 32 and it is supplied to the conduits 7, 13 thereby. The pressurized fluid is returned through the conduit 13 and the valve device 12 to the master cylinder 1 side. In the above-described manner, the anti-skid control operation is effected.

Generally, the braking force is distributed to the wheels such that the braking force to the rear wheels 19a, 19b is smaller than that to the front wheels 9a, 9b. For example, the brake fluid is supplied through the proportional reducing valves to the wheel cylinders of the rear wheels 19a, 19b. Accordingly, the front wheels 9a, 9b have a tendency to lock. On the other hand, the rear wheels 19a and 19b lock seldom. Thus, in this embodiment, the check valve device 6 is provided in the brake conduit system for the front wheels 9a, 9b, and it is not provided in the brake fluid conduit system for the rear wheels 19a, 19b. The rear wheels 19a, 19b have little tendency to lock. The braking force to the rear wheels 19a, 19b needs little to decrease. Accordingly, the discharge fluid pressure of the fluid pressure pump 32 is seldom applied to the master cylinder side through the conduits 13 and 11. Thus, little kick-back phenomenon to the foot of the driver through the pedal 4 occurs.

During the driving slip control operation, the valve device 12 is changed over to the cut-off position G. Thus, the discharging pressure of the fluid pressure pump 32 or the accumulated fluid pressure of the accumulator 42b is applied to the valve device 12. However, when the discharging pressure of the fluid pressure pump 32 becomes higher than the opening pressure of the check valve 46b, it is relieved to the master cylinder 1. Thus, the fluid pressure pump 32 and the valve device 12 are protected from damage due to high pressure. Further, the accumulator 42b can be small sized. During the anti-skid control operation, the check valve device 6 takes the position E. Also in that case, the check valve 46a functions as a relief valve. Thus, the fluid pressure pump 32 and the check valve device 6 are protected from the damage due to high pressure. Further, the accumulator 42a can be small-sized.

Figure 2:
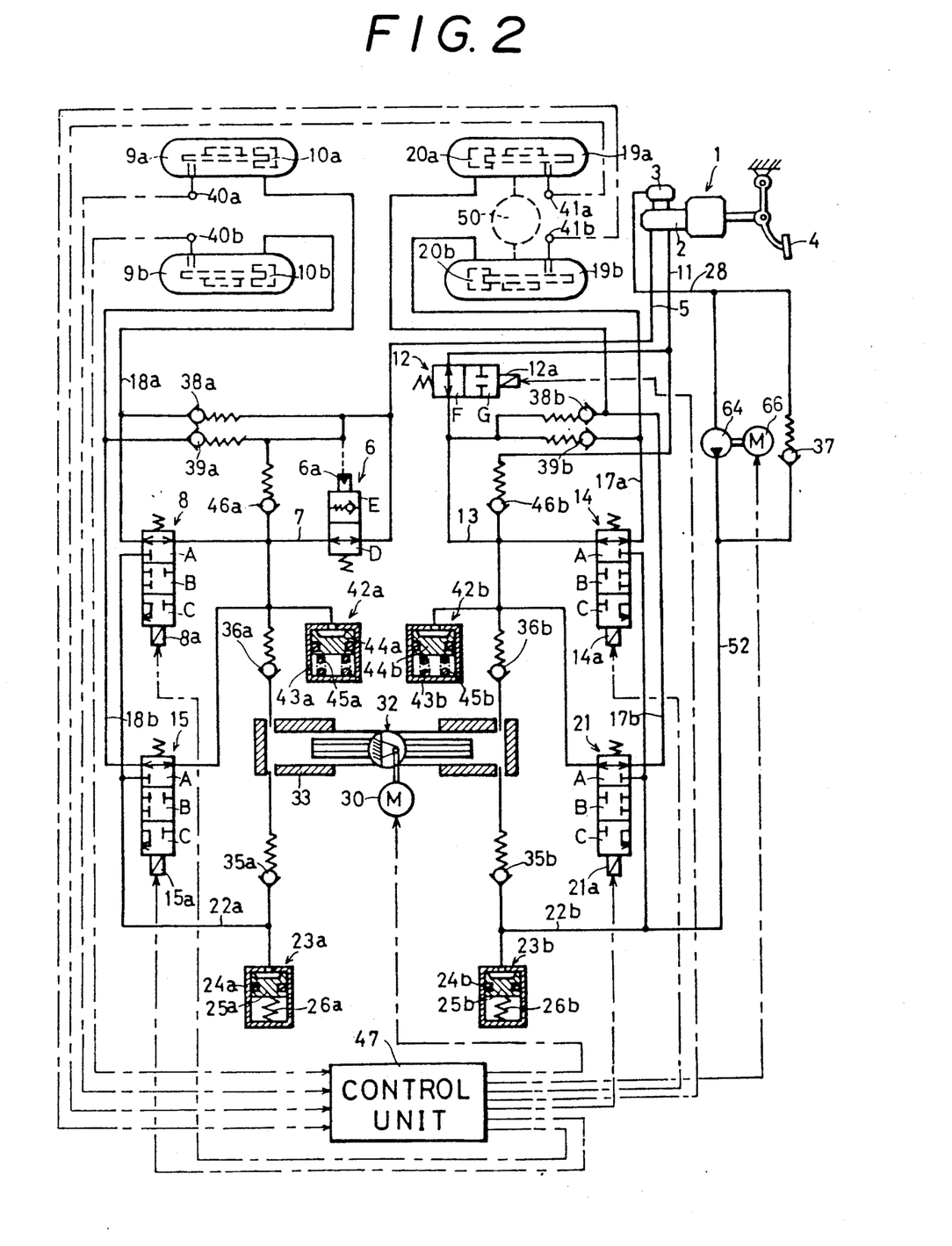

FIG. 2 shows a fluid pressure brake control apparatus according to a second embodiment of this invention. Parts in FIG. 2 which correspond to those in FIG. 1, are denoted by the same reference numerals, the description of which will be omitted.

An auxiliary fluid pressure pump 64 is provided in a conduit 52 connecting the reservoir 3 of the tandem master cylinder 1 with the reservoir 23b. However, an electric motor 66 for driving the auxiliary fluid pressure pump 64 can be independently controlled from the electric motor 30 for driving the first fluid pressure pump 32. Thus, the cut-off valve device 27 of the first embodiment is not required. During the anti-skid control operation, the electric motor 66 is not driven. Accordingly, the brake fluid is not sucked from the reservoir 3 of the master cylinder 1. The other construction, arrangement and operations of this embodiment are the same as those of the first embodiment. Thus, the description of them will be omitted. Both in the first embodiment and in the second embodiment, the auxiliary fluid pressure pump 29 or 64 is provided in the conduit connecting the tandem master cylinder 1 with the reservoir 23b. During the driving slip control operation, it functions to open the check valve 35b arranged at the suction side of the first fluid pressure pump 32. Accordingly, on the rapid start of the vehicle, the slip of the drive wheels 19a, 19b can be rapidly controlled to the optimum slip value or slip ratio. Thus, the steering ability and directional ability of the vehicle can be rapidly stabilized.

Figure 3:
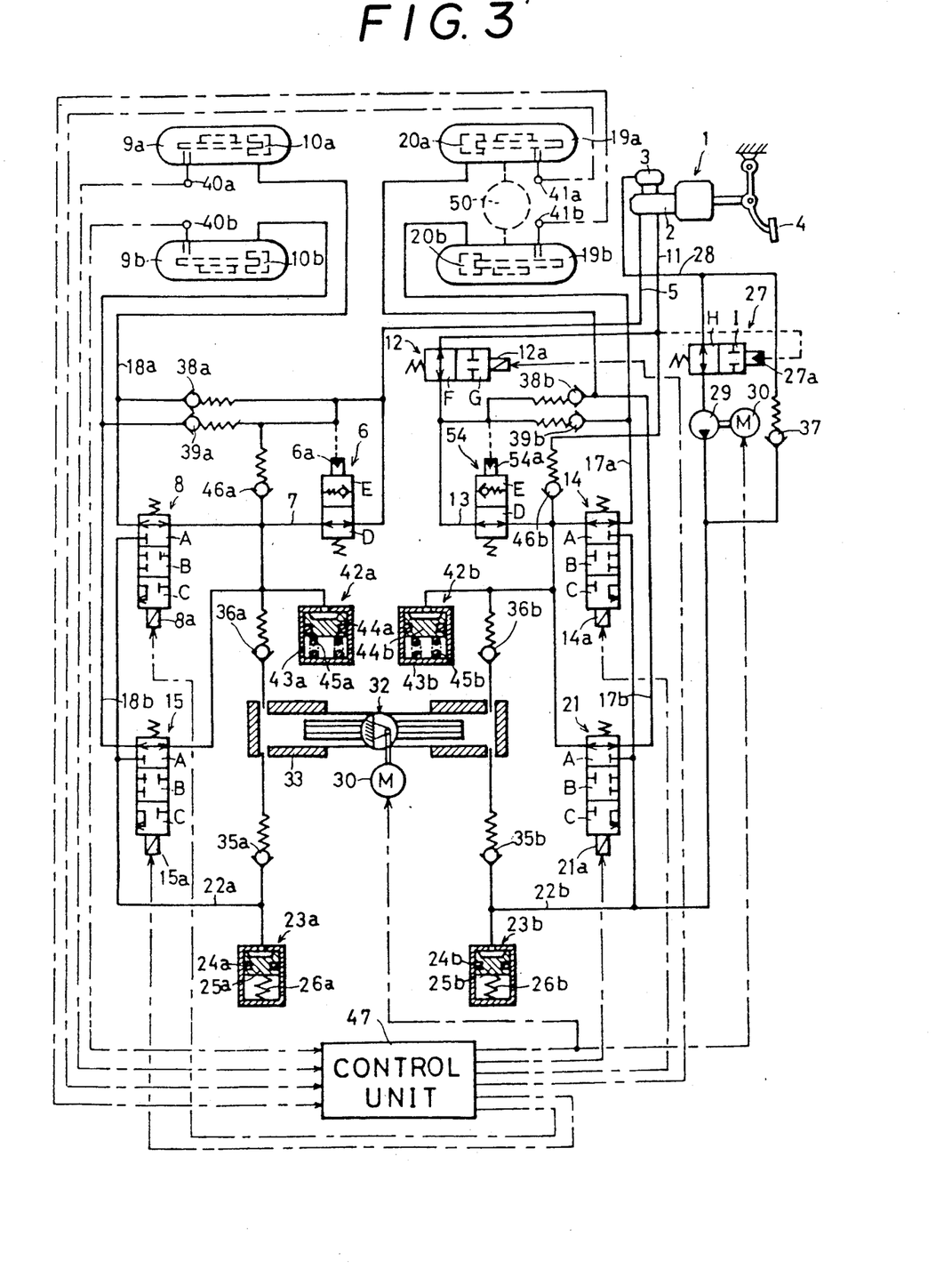

FIG. 3 shows a fluid pressure brake control apparatus according to a third embodiment of this invention. Parts in FIG. 3 which correspond to those in FIG. 1 or FIG. 2 are denoted by the same reference numerals, the description of which will be omitted.

A check valve device 54 which has the same construction as the check valve device 6 of the first or second embodiment, is connected between the cut-off valve device 12 and the change-over valve 14. A pressure detecting portion 54a of the check valve device 54 is so connected as to detect the pressure of the conduit 13. It is clear that this embodiment has the same effect and operation as the first and second embodiments of FIG. 1 and FIG. 2.

Also when the rear wheels 19a, 19b have a tendency to lock and so braking force to the rear wheels 19a, 19b needs to be decreased, the kick-back phenomena to the brake pedal 4 can be avoided in this embodiment.

Figure 4:
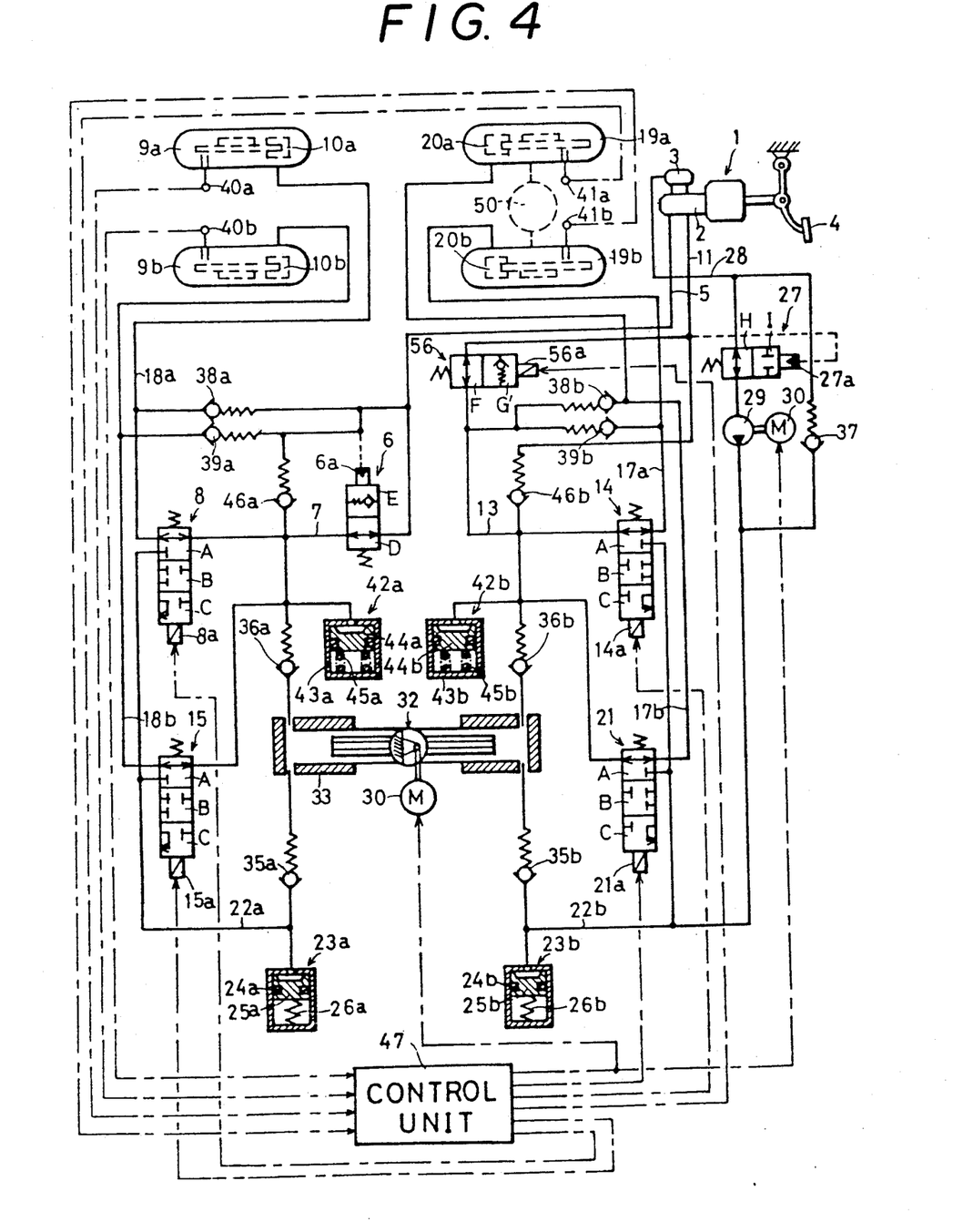

FIG. 4 shows a fluid pressure brake control apparatus according to a fourth embodiment of this invention. Parts in FIG. 4 which correspond to those in FIG. 1 or FIG. 2 are denoted by the same reference numerals, the description of which will be omitted.

In this embodiment, a check valve device 56 is arranged in place of the cut-off valve device 12 of the first embodiment or the second embodiment. The check valve device 56 normally takes a position F in which both sides communicate with each other. When the solenoid portion 56a of the valve device 56 is energized, it is changed over to a position G' in which it functions as a check valve. Thus, in the position G', it permits the fluid only to flow from the master cylinder side to the change-over valve 14 side.

It is clear that this embodiment has the same operation and effect as the above-described embodiments.

Figure 5:
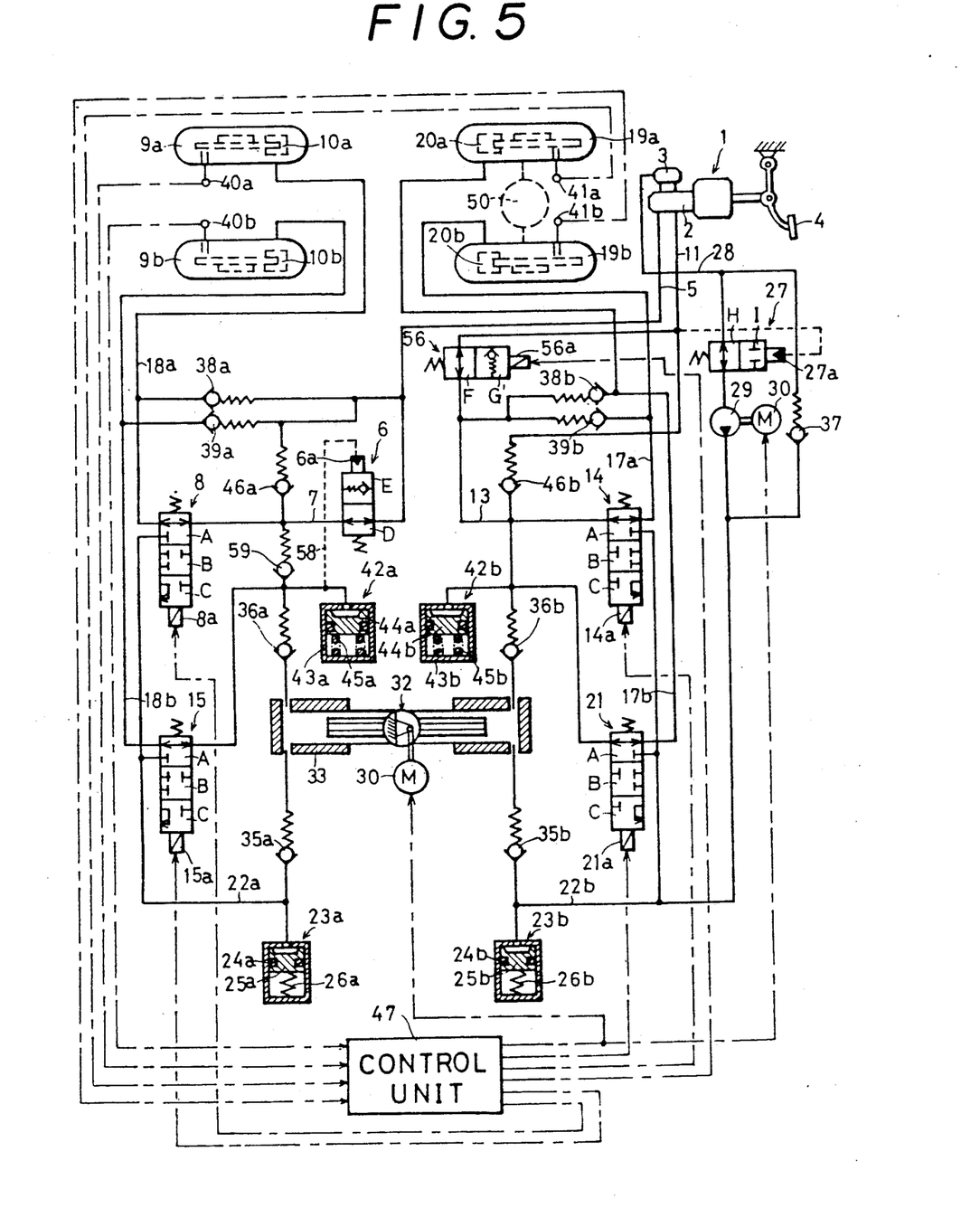

FIG. 5 shows a fifth embodiment of this invention. Parts in FIG. 5 which correspond to those in FIG. 1 and FIG. 4 are denoted by the same reference numerals, the description of which will be omitted.

The check valve device 6 of the first and fourth embodiments is changed over to the check valve position E when the pressure of the master cylinder becomes higher than the predetermined value. In this embodiment, the pressure detecting portion 6a of the check valve device 6 is connected through a detecting conduit 58 to the accumulating chamber of the accumulator 42a or the discharging side of the fluid pressure pump 32. Thus, the accumulating pressure of the accumulator 42a or the fluid pressure of the fluid pressure pump 32 is detected by the pressure detecting portion 6a. When the pressure of the accumulator 42a or of the fluid pressure pump 32 becomes higher than a predetermined value, which is, however, lower than the relief or opening fluid pressure of the check valve 46a, the check valve device 6 is changed over to the position E in which it functions as the check valve.

Further, a check valve 59 is arranged between the conduit 7 and the accumulator 42a or the discharging side of the fluid pressure pump 32. Thus, when the brake pedal 4 is trodden, the brake fluid is prevented from flowing into the detecting conduit 58 connected to the pressure detecting portion 6a of the check valve device 6 and accumulator 42a, and so the brake fluid is prevented from unnecessarily being consumed. Further, the check valve 59 gives a transmission lag, and so it prevents the fluid pressure of the fluid pressure pump 32 or the accumulator 42a from being transmitted to the output side of the check valve device 6 before changed over.

In the embodiments of FIG. 1 and FIG. 2, the brake fluid is supplied into the fluid pressure detecting conduit connected to the pressure detecting portion 6a of the check valve device 6 and accumulator 42a in the normal brake control operation. Thus, it is consumed. On the other hand, in this embodiment, the brake fluid is prevented from being consumed by them in the normal brake control operation. Accordingly, the brake fluid can be more effectively used in this embodiment.

The other operation and effect of this embodiment are the same as those of the above described embodiments. Accordingly, the description of them will be omitted.

Figure 6:
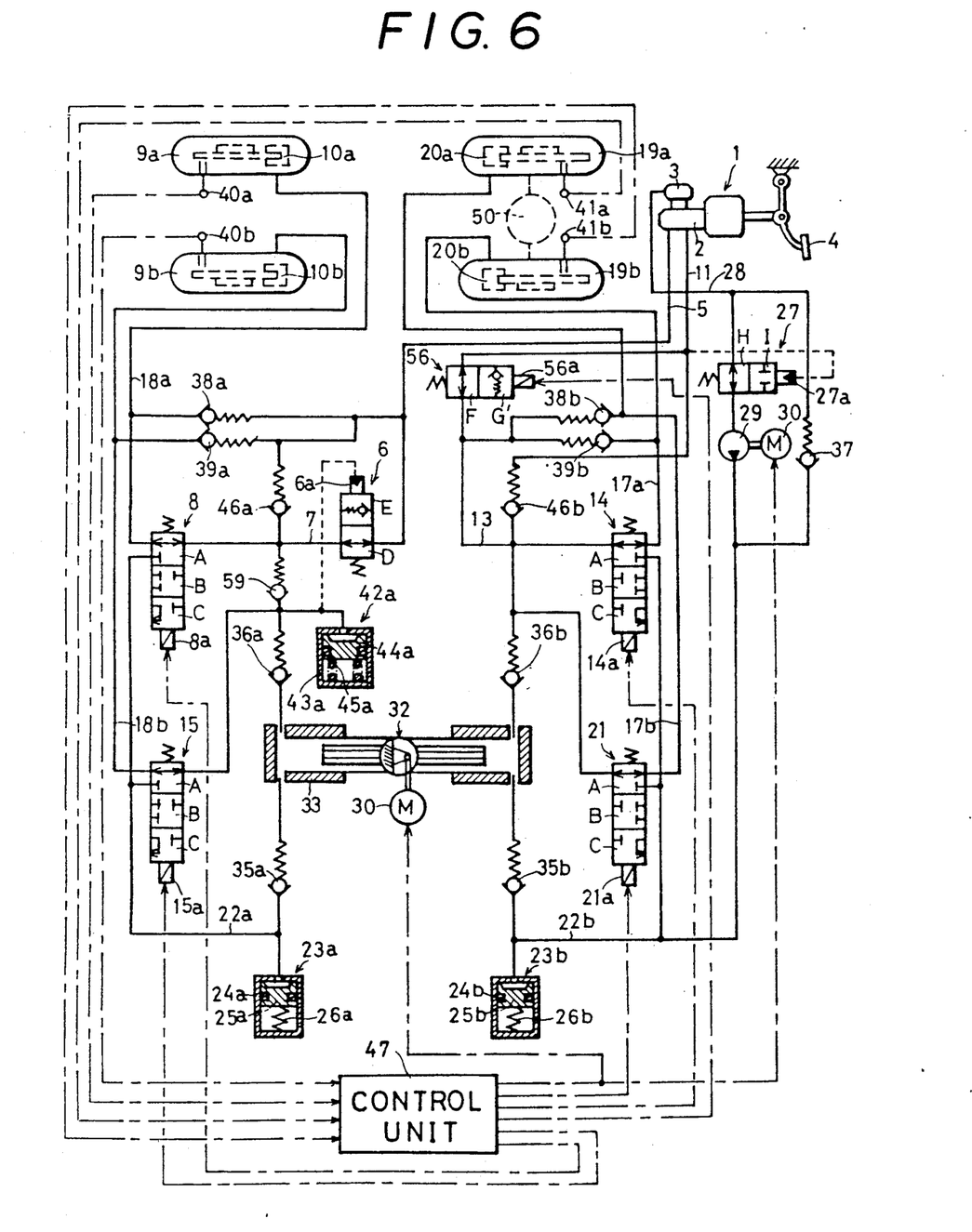

FIG. 6 shows a sixth embodiment of this invention. Parts in FIG. 6 which correspond to those in FIG. 5 are denoted by the same reference numerals, the description of which will be omitted.

In this embodiment, the accumulator 42b is omitted in comparison with the embodiment of FIG. 5. As above described, the braking force is so distributed that the braking force to the rear wheels is smaller than that to the front wheels. Accordingly, it is seldom that the rear wheels lock. In consideration of such a fact, the accumulator 43b can be omitted. Accordingly, the apparatus can be more light and its cost can be reduced.

The other operation and effect of this embodiment are the same as those of the above described embodiments. Accordingly, the description of them will be omitted.

Figure 7:
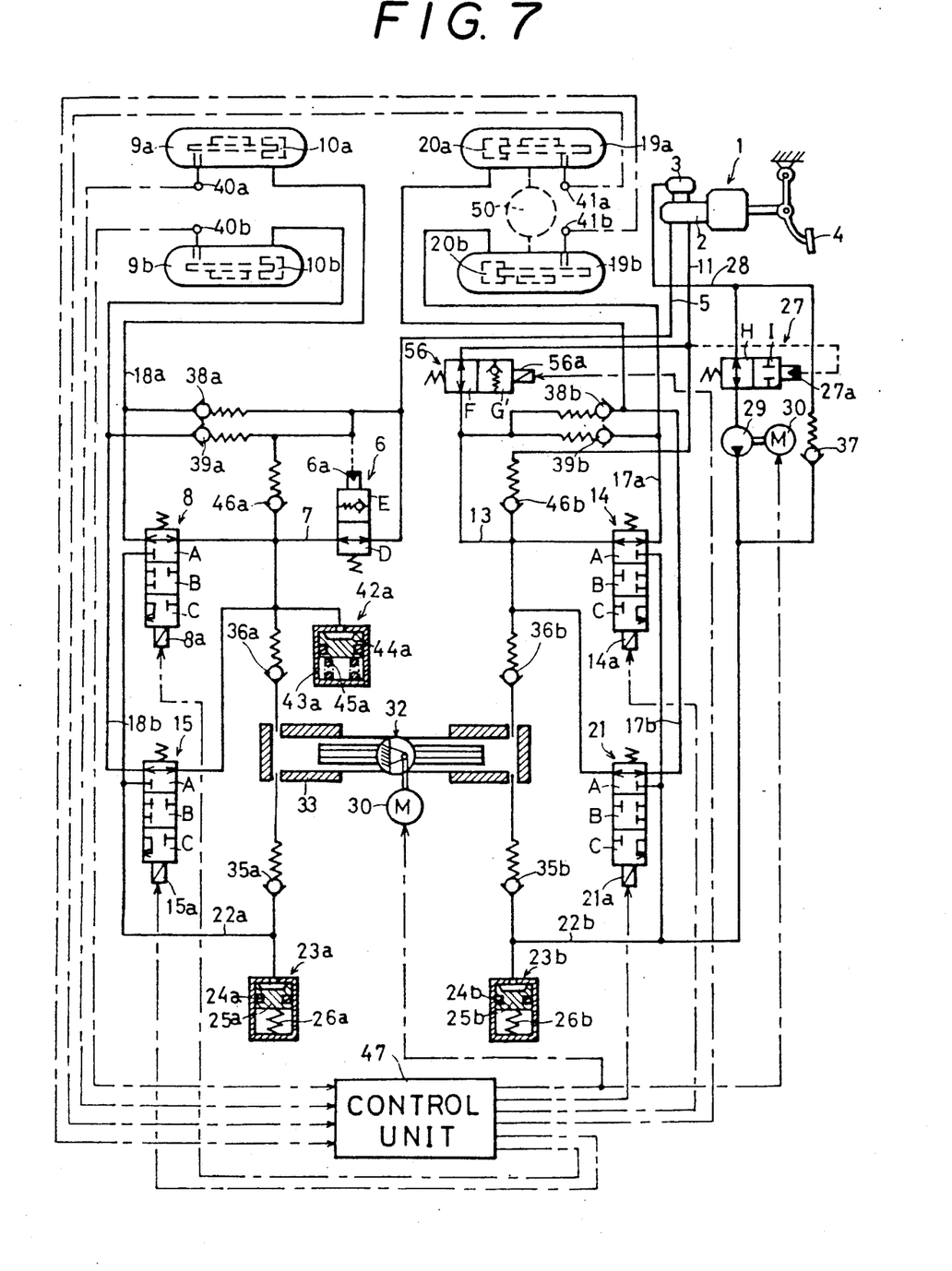

FIG. 7 shows a seventh embodiment of this invention. Parts in FIG. 7 which correspond to those in FIG. 4 are denoted by the same reference numerals, the description of which will be omitted.

In comparison with the embodiment of FIG. 4, the accumulator 42b is omitted in this embodiment. The other construction of this embodiment is the same as that of the fourth embodiment. Operation and effect of this embodiment are the same as those of the fourth embodiment or the sixth embodiment. Accordingly, the description of them will be omitted.

Figure 8:
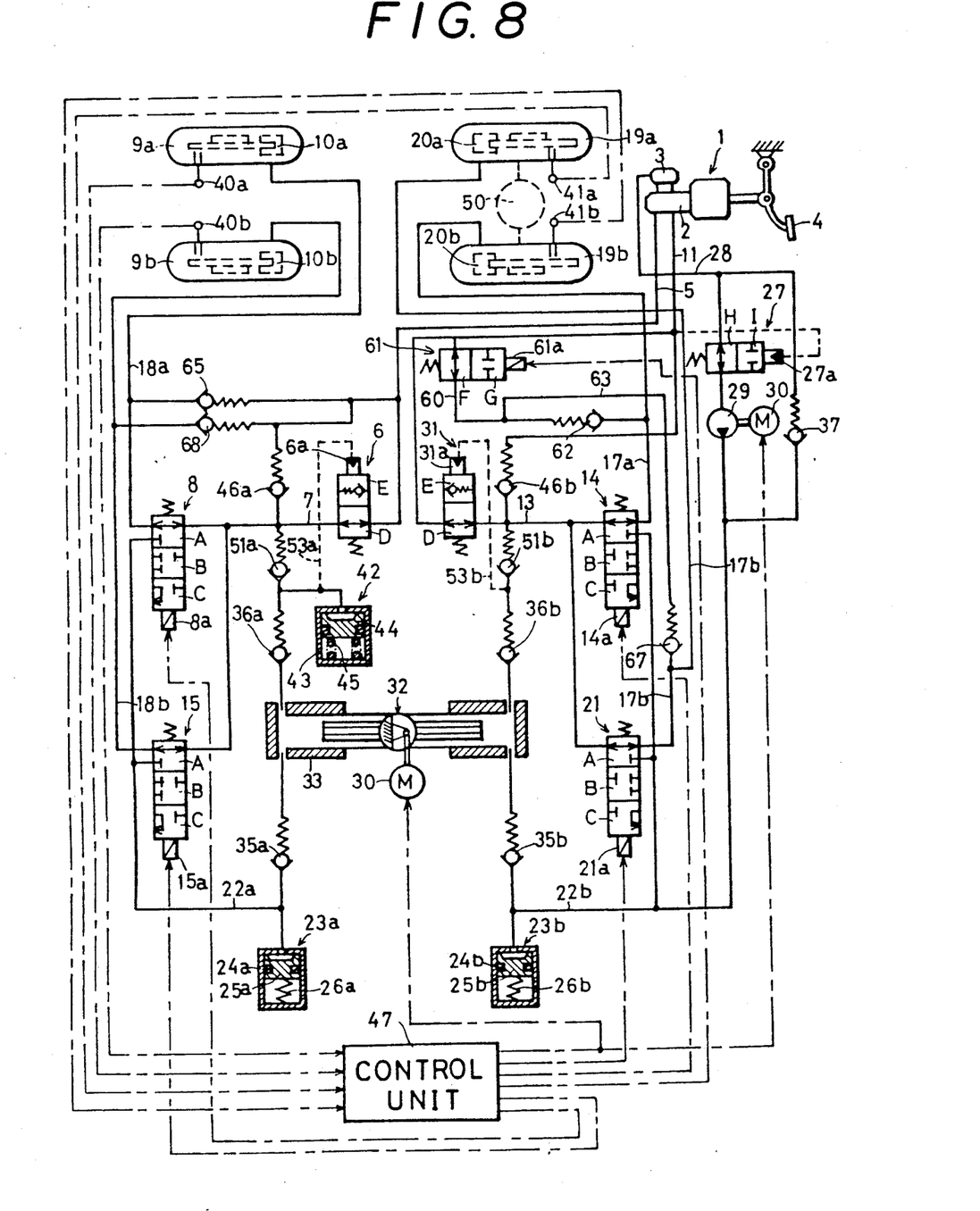

FIG. 8 shows an eighth embodiment of this invention. Parts in FIG. 8 which correspond to those in FIG. 1, are denoted by the same reference numerals, the description of which will be omitted.

In this embodiment, a check valve device 31 is arranged between the master cylinder 1 and the change-over valve 14. A pressure detecting portion 31a of the check valve device 31 is connected through a pressure detecting conduit 53b to the discharging side of the fluid pressure pump 32. The function of the check valve device 31 is the same as that of the check valve device 6.

A cut-off valve device 61 and a check valve 62 are connected in series with each other, in a by-pass conduit 60 which by-passes the check valve device 31 and the change-over valve 14. The by-pass conduit 60 is connected through the conduit 17a to the wheel cylinder 20b of the left rear wheel 19b as the drive wheel. The check valve 62 permits fluid to flow from the wheel cylinder side towards the master cylinder side. A conduit 63 is divided from the by-pass conduit 60, and it is connected through the conduit 17b to the wheel cylinder 20a of the right rear wheel 19a as the drive wheel. A check valve 67, which permits fluid to flow from the wheel cylinder side towards the master cylinder side, is connected in the conduit 63.

Check valves 65 and 68 are connected in parallel with the change-over valves 8 and 15, and they correspond to the check valves 38a and 39a in FIG. 1, respectively.

Further, check valves 51a and 51b are connected to the discharging side of the fluid pressure pump 32, and they correspond to the check valve 59 of the embodiment of FIG. 6. A pressure-detecting conduit 53a corresponds to the conduit connected to the pressure detecting portion 6a of the check valve device 6 of FIG. 6.

When the driving slip control is effected, a solenoid portion 61a is energized to change over the cut-off valve device 61 into the cut-off position G. The brake fluid from the wheels 19a and 19b can be rapidly returned through the check valves 62 and 67 to the master cylinder 1. Because the change-over valves 8, 14, 15, 21 have generally some throttle between the input and output ports. When the anti-skid control is effected, the valve device 61 takes the position F. However, the fluid does not flow to the master cylinder 1, since the pressure of the master cylinder is higher than that of the wheel cylinder.

The other operation and effect of this embodiment are the same as those of the embodiments of FIG. 1, FIG. 3 and FIG. 6, the description of which will be omitted.

Figure 9:
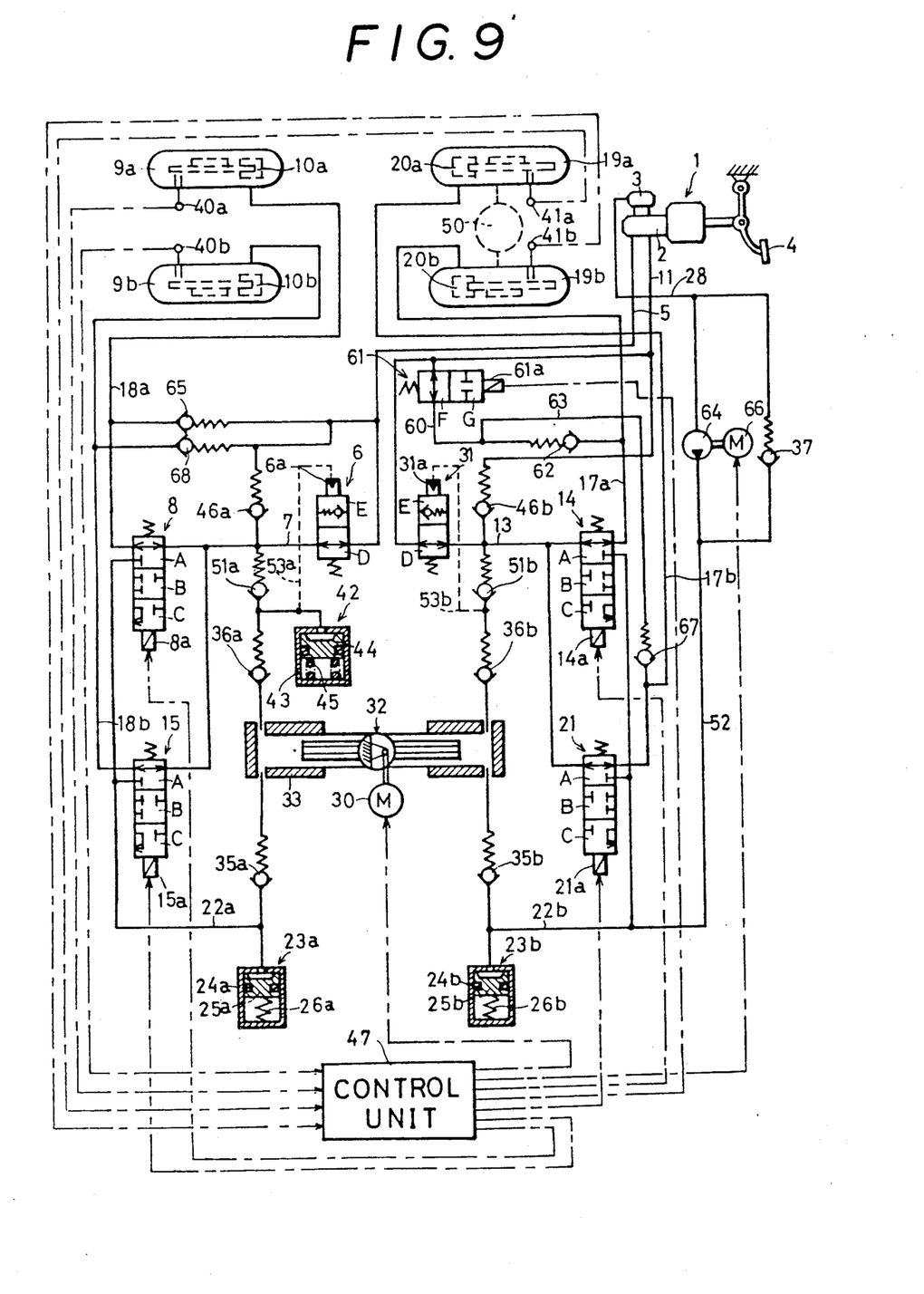

FIG. 9 shows a ninth embodiment of this invention. Parts in FIG. 9 which correspond to those in FIG. 8 and FIG. 2, are denoted by the same reference numerals, the description of which will be omitted. In this embodiment, the cut-off valve device 27 is omitted in comparison with the embodiment of FIG. 8. The operation and effect of this embodiment are almost the same as those of the embodiments of FIG. 2 and FIG. 8.

While the preferred embodiments have been described, variations thereto will occur to those skilled in the art within the scope of the present inventive concepts which are delineated by the following claims.

For example, in the embodiment of FIG. 1, the cut-off valve device 12 is used. In the driving slip control operation, it is changed over to the position G in which it functions as a cut-off valve. Instead, in the position G, it may function as a relief valve. Thus, it functions as a check valve which permits the brake fluid to flow from the discharging side of the fluid pressure pump 32 towards the master cylinder 1 side when the discharging pressure of the fluid pressure pump 32 becomes higher than a predetermined value. Accordingly, the valve device 12 is protected from damage due to an extraordinarily high pressure of the fluid pressure pump 12, without the check valve 46b.

Further in the first embodiment of FIG. 1, the cut-off valve device 12 is changed over to the position G when the driving slip control is effected. On the other hand, when the anti-skid control is effected, the cut-off valve device 12 remains at the position F. Instead, in the anti-skid control, the cut-off valve device 12 may be changed to the position G in the embodiment of FIG. 1. Or the check valve device 56 may be changed over to the position G' in the anti-skid control operation in the embodiment of FIG. 4. Or the check valve device 56 or cut-off valve device 12 may be alternately changed between the position F and the position G or G'.

Further, in the embodiment of FIG. 1, the check valve device 6 is changed over to the position E when the fluid pressure of the master cylinder 1 becomes higher than the predetermined value. And in the embodiment of FIG. 5, the check valve device 6 is changed over to the position E, when the discharging fluid pressure of the fluid pressure pump 32 becomes higher than the predetermined value. Instead, the discharging fluid pressure of the fluid pressure pump 32 may be compared with the pressure of the master cylinder 1 or the pressure of the wheel cylinder. And when the discharging pressure of the fluid pressure pump 32 becomes higher beyond a predetermined value than the fluid pressure of the master cylinder or the fluid pressure of the wheel cylinder, the check valve device 6 may be changed to the check valve position E. Or instead of the check valve device 6, a cut-off valve device may be used.

Further, in the embodiment of FIG. 1, the check valve 46b as a relief valve is arranged in parallel with the cut-off valve device 12. It may be omitted. In that case, the discharging pressure of the fluid pressure pump 32 is entirely stored in the accumulator 42b. Accordingly, the volume of the accumulator 42b should be larger. Further, the relief valve 46a arranged in the conduit by-passing the valve device 6 may be omitted. In that case, the volume of the accumulator 42a should be larger. Further, when the discharging fluid pressure of the first fluid pressure pump 32 becomes higher than a predetermined value, or when the discharging fluid pressure of the first fluid pressure pump becomes higher beyond a predetermined value than the fluid pressure of the master cylinder, the discharging fluid of the first fluid pressure pump 32 may be returned into the second hydraulic reservoirs 23a, 23b in the well known manner.

Further in the above embodiments, the three-port three-position electro-magnetic change-over valve is used as a fluid pressure control valve. Instead, two valves or an inlet valve and an outlet valve may be used for the one three-port three-position electro-magnetic change-over valve.

Further, in the embodiments of FIG. 1 and FIG. 2, the pressure detecting portion 27a of the cut-off valve 27 detects that the pressure of the conduit 11 becomes higher than the predetermined value and thereby the cut-off valve device 27 is changed over to the cut-off position I. Instead, an electro-magnetic valve may be used in place of the cut-off valve device 27. In that case, a signal which generates with treading of the brake pedal is supplied to the solenoid portion of the electro-magnetic valve. Or a control signal for the anti-skid control operation may be used to change over the electro-magnetic cut-off valve device.

In the above embodiments, the front-rear separation brake conduit system is explained. Instead, X-conduit system, J-conduit system or H-conduit system may be used.

Further in the above embodiments, when the driver treads the brake pedal 4 during the driving slip control, the change-over valves 8, 14, 15, 21 and the first valve device 12 may be forcibly changed over to the initial positions A and F, respectively and then the power applied to the electric motor for the fluid pressure pumps 32 and 29 may be stopped. Thus, the brake can be applied in accordance with the will of the driver.

Further in the above embodiments, only the rear wheels are drive wheels. Instead, only the front wheels may be drive wheels. Or this invention may be applied to the 4-WD (four-wheel drive) type vehicle. Further, this invention may be applied to a bicycle.

Further, in the above embodiments, four change-over valves 8, 14, 15, 21 are used. In other words, a 4-channel system is employed in the above embodiments. Instead, a 1-channel, 2-channel or 3-channel system may be applied to this invention.

Further, in the embodiments of FIG. 8 and FIG. 9, the check valves 51a, 51b are arranged at the discharging side of the fluid pressure pump 32 for obtaining the transmission lag of the fluid pressure of the fluid pressure pump 32 to the output side of the check valve devices 6 and 31. Instead, throttle valves may be used in place of the check valves 51a, 51b.

Further, in the embodiments of FIG. 8 and FIG. 9, the cut-off valve device 61 and the check valve 62 or 67 ar connected in series with each other, in the by-pass conduit by-passing the change-over valves 14 and 21. And the cut-off valve device 61 is connected to the master cylinder side. Instead, the check valves 62 and 67 may be connected to the master cylinder side, and the cut-off valve device 61 may be connected to the wheel cylinder side.

What is claimed is:

1. A fluid pressure brake control apparatus for a vehicle having at least one front wheel and at least one rear wheel, comprising:
   (a) a tandem master cylinder;
   (b) a front wheel brake apparatus for said front wheel;
   (c) a rear wheel brake apparatus for said rear wheel;
   (d) a control unit for judging braking slip and/or driving slip of said front and rear wheels;
   (e) a fluid pressure control valve means for receiving instructions from said control unit to control brake fluid pressures to said front and rear wheel brake apparatuses;
   (f) a hydraulic reservoir means for reserving brake fluid discharged through said fluid pressure control valve means from said front and/or rear wheel brake apparatuses, said hydraulic reservoir means consisting of a first hydraulic reservoir for reserving brake fluid and a second hydraulic reservoir for reserving brake fluid;
   (g) a main conduit means connecting said tandem master cylinder with said fluid pressure control valve means;
   (h) a first fluid pressure pump means for pressurizing and supplying brake fluid from said hydraulic reservoir means into said main conduit means, said pump means having a discharging side and a master cylinder side;
   (i) a first valve device arranged between said tandem master cylinder and said first fluid pressure pump means in said main conduit means, said first valve device being connected through said fluid pressure control valve means to said front and/or rear wheel brake apparatuses for said front and/or rear wheels as driven wheels, said first valve device being normally in free communication and being changed over into a position to prohibit brake fluid to flow from the discharging side of said first fluid pressure pump means towards said master cylinder side under a first predetermined condition;
   (j) a second valve device arranged between said tandem master cylinder and said first fluid pressure pump means in said main conduit means, said second valve device being connected through said fluid pressure control valve means at least to said front brake apparatus for said front wheel, wherein said front wheels are more apt to lock than said rear wheels, said second valve device being normally in free communication and being changed over into a position to prohibit brake fluid to flow from the discharging side of said first fluid pressure pump means towards said master cylinder side under a second predetermined condition;
   (k) a second conduit connecting said first hydraulic reservoir with said second hydraulic reservoir; and
   (l) a second fluid pressure pump means arranged in said second conduit, said second pump means having a discharging side directed to the suction side of said first fluid pressure pump means.

2. A fluid pressure brake control apparatus for a vehicle according to claim 1, further comprising a third valve device arranged between said first hydraulic reservoir and the suction side of said second fluid pressure pump means in said conduit.

3. A fluid pressure brake control apparatus for a vehicle according to claim 1, wherein said second fluid pressure pump means is controlled independently of said first fluid pressure pump means.

4. A fluid pressure brake control apparatus for a vehicle according to claim 1 or 2 wherein said first valve device functions as a relief valve to relieve the discharging fluid pressure in said first fluid pressure pump means towards the master cylinder side, when the discharging fluid pressure of said first fluid pressure pump means becomes higher than a predetermined pressure.

5. A fluid pressure brake control apparatus for a vehicle according to claim 1 or 2, wherein said first valve device functions as a check valve to permit the brake fluid to flow only from the master cylinder side of said first pump means towards said fluid pressure control valve means in accordance with said first predetermined condition.

6. A fluid pressure brake control apparatus for a vehicle according to claim 1 or 2 further comprising a relief valve arranged in parallel with said first valve device so that when the fluid pressure of said first fluid pressure pump means becomes higher than a predetermined pressure, said relief valve relieves the discharging fluid pressure of said first fluid pressure pump means towards said master cylinder side.

7. A fluid pressure brake control apparatus for a vehicle according to claim 1 or 2, wherein said first valve device functions as a cut-off valve under said first predetermined condition.

8. A fluid pressure brake control apparatus for a vehicle according to claim 1 or 2 wherein said first predetermined condition is the condition whereby drive wheel slippage is controlled.

9. A fluid pressure brake control apparatus for a vehicle according to claim 1 or claim 2, wherein said second predetermined condition is the condition whereby the fluid pressure of said tandem master cylinder becomes higher than a predetermined value.

10. A fluid pressure brake control apparatus for a vehicle according to claim 1 or 2, wherein said second predetermined condition is the condition whereby the fluid pressure of said first fluid pressure pump means becomes higher than a predetermined value.

11. A fluid pressure brake control apparatus for a vehicle according to claim 1 or 2, wherein said second predetermined condition is the condition whereby the fluid pressure of said first fluid pressure pump means becomes higher than the fluid pressure of said tandem master cylinder by a predetermined value.

12. A fluid pressure brake control apparatus for a vehicle according to claim 1 or 2, wherein said second predetermined condition is the condition whereby the fluid pressure of said first fluid pressure pump means becomes higher than the fluid pressure of said wheel brake apparatus by a predetermined value.

13. A fluid pressure brake control apparatus for a vehicle according to claim 1 or 2, further comprising a hydraulic accumulator connected only in one portion of said main conduit means connected through said fluid pressure control valve means to said front brake apparatus.

14. A fluid pressure brake control apparatus for a vehicle having at least one front wheel and at least one rear wheel, comprising:
    (a) a tandem master cylinder;
    (b) a front wheel brake apparatus for said front wheel;
    (c) a rear wheel brake apparatus for said rear wheel;
    (d) a first brake conduit system connected to said tandem master cylinder and said front wheel brake apparatus;
    (e) a second brake conduit system connected to said tandem master cylinder and said rear wheel brake apparatus;
    (f) a control unit for judging braking slip and/or driving slip of said front and/or rear wheels;
    (g) a fluid pressure control valve means arranged in said first and second brake conduit systems for receiving instructions from said control unit to control brake fluid pressures to said wheel brake apparatuses;
    (h) a hydraulic reservoir means for reserving brake fluid discharged from said wheel brake apparatuses through said fluid pressure control valve means, said reservoir means consisting of a first hydraulic reservoir for reserving previously discharged brake fluid and a second hydraulic reservoir capable of reserving brake fluid;
    (i) a main conduit means connecting said tandem master cylinder with said fluid pressure control valve means;
    (j) a first fluid pressure pump means for pressurizing brake fluid in said hydraulic reservoir means and supplying brake fluid to said main conduit, said first pump means having a discharging side and a tandem master cylinder side;
    (k) a check valve apparatus arranged between the discharging side of said first fluid pressure pump means and said tandem master cylinder, said check valve apparatus operating to cut off at least any fluid communication directing from the discharging side of said first fluid pressure pump means towards said tandem master cylinder side of said first fluid pressure pump means;
    (l) a by-pass conduit means connecting said wheel brake apparatuses with said tandem master cylinder and by-passing said fluid pressure control valve means and said check valve apparatus;
    (m) a cut-off valve means arranged in said by-pass conduit means, said cut valve means being normally in a free communicating state and changing over to a cut-off state to control driving slip;
    (n) a second fluid pressure pump means arranged in said conduit connecting said first and second hydraulic reservoirs said second fluid pressure pump having a discharging side directed to the suction side of said first fluid pressure pump means; and
    (o) a hydraulic accumulator arranged only in the discharging side of said first fluid pressure pump means and belonging to one of said first and second brake conduits wherein the wheels associated with said brake conduits system having said accumulator arranged therein are more apt to lock in comparison to the wheels associated with the brake conduit system which does not have said accumulator arranged therein.

15. A fluid pressure brake control apparatus for a vehicle according to claim 14, further comprising a check valve connected in series with said cut valve means.

16. A fluid pressure brake control apparatus for a vehicle according to claim 14, further comprising a second cut valve means arranged between said first hydraulic reservoir and the suction side of said second fluid pressure pump means in said by-pass conduit.

17. A fluid pressure brake control apparatus for a vehicle according to claim 14, wherein said second fluid pressure pump means is controlled independently from said first fluid pressure pump means.

* * * * *